Dec. 7, 1965 J. MULLER 3,221,884
APPARATUS FOR REMOVING A SURFACE LAYER FROM A BODY OF LIQUID
Filed Jan. 2, 1962 2 Sheets-Sheet 1
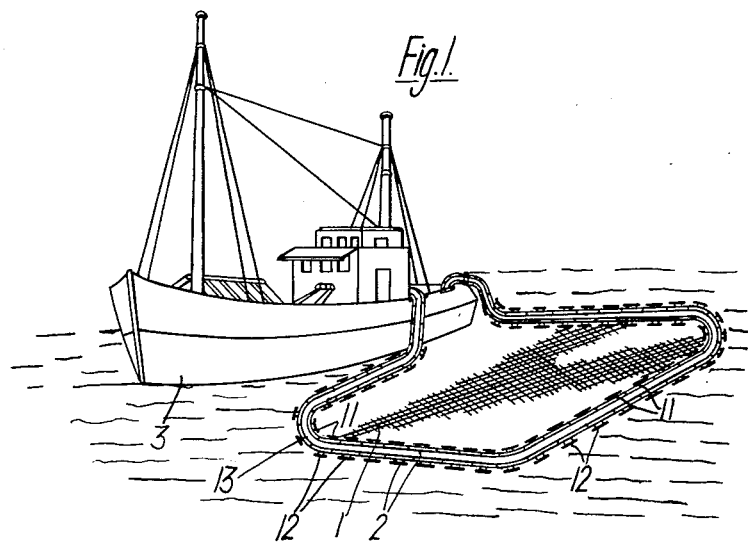
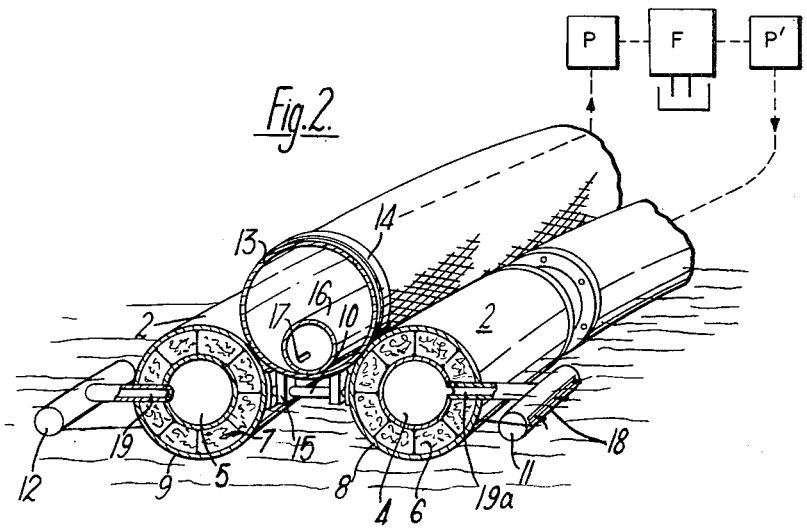
*Inventor*
JACQUES MULLER
By Jumie and Jumley
*Attorney*

Dec. 7, 1965 J. MULLER 3,221,884
APPARATUS FOR REMOVING A SURFACE LAYER FROM A BODY OF LIQUID
Filed Jan. 2, 1962 2 Sheets-Sheet 2
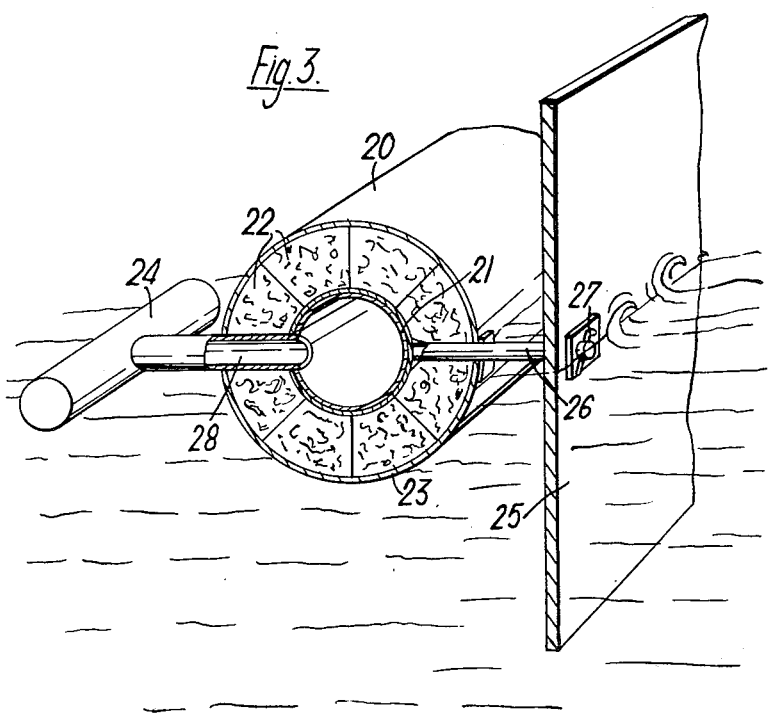
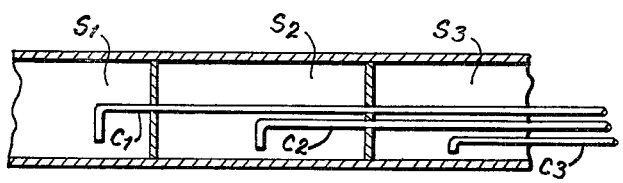
Inventor
JACQUES MULLER
By *Irwin and Finley*
Attorney

United States Patent Office 3,221,884
Patented Dec. 7, 1965

3,221,884
APPARATUS FOR REMOVING A SURFACE LAYER
FROM A BODY OF LIQUID
Jacques Muller, 123 Ave. du General de Gaulle,
La Garenne-Colombes, Seine, France
Filed Jan. 2, 1962, Ser. No. 163,636
Claims priority, application France, Jan. 31, 1961,
851,180; Aug. 17, 1961, 870,896
6 Claims. (Cl. 210—242)

This invention relates to apparatus for rapidly and completely removing the surface layer of a liquid and, more particularly, for removing a layer of liquid of low density from a body of liquid of higher density. An example is a layer of oil or other liquid of low density floating on the surface of a lake, river or sea.

The pollution of rivers, lakes and the sea by oil discharged either accidentally or deliberately by ships, factories, garages, etc. often creates a very serious problem in that the oil may be washed up on to the shore. Apart from causing death and injury to birds these layers are dirty and malodorous and may often be dangerous due to their inflammability and noxiousness.

One object of the invention is to provide apparatus for rapidly and completely removing the surface layer of a liquid.

Another object is to provide apparatus by means of which selected areas of rivers, lakes or the sea may rapidly be cleaned by the removal of the offending layer.

A further object is to provide apparatus for the separation of the liquid, for example, fuel oil, constituting the surface layer from the liquid constituting the body of the liquid, so that it may be recovered and subsequently used for its originally intended purpose or for some other purpose.

Other objects and advantages of the invention will become apparent from a study of the subjoined description of selected embodiments thereof, in conjunction with the accompanying drawings, in which:

FIGURE 1 is a pictorial view of the apparatus of the invention being used from a ship which contains the filtering apparatus;

FIGURE 2 is a cross-section of one arrangement of floating pipe line provided with auxiliary elements;

FIGURE 3 shows an arrangement of a pipe which carries a baffle to break waves so that the part of the surface of the liquid body which is being treated is maintained in a relatively calm state; and FIG. 4 is a diagrammatic sectional view showing a pipe having a plurality of sections.

Referring to the drawings, there is shown in FIGURE 1 a body of liquid, in this case the sea, having a surface layer 1 of oil or other liquid floating on its surface which is to be removed. A pipe line 2 whose detailed construction will be described later, passes over the side of a ship 3 and is arranged around the patch of oil 1. Both ends of the pipe line are in the ship. However, the two ends might be in different ships or the apparatus might be operated from the shore. As shown in FIGURE 2, the pipe line consists of a pair of pipes but, as will appear subsequently, the pipe line may consist of three or more pipes or even a single pipe. The two pipes 2 are arranged parallel to each other. The pipe shown on the left in FIGURE 2 consists of an inner pipe 5 surrounded by a layer 7 of light buoyant material which, in turn, is covered by a waterproof sheath 9. The right-hand pipe consists of an inner pipe 4 surrounded by a layer 6 of buoyant material and an outer waterproof sheath 8. The two pipes may consist of rigid sections connected together, as shown in the case of the right-hand pipe in FIGURE 2, or they may be of any other convenient construction, provided that they are flexible.

The two pipes 2 are separated from each other and held in substantially parallel relationship by spacer bars 10. A third pipe 13, which is also flexible, is supported on the spacer bars 10 and is held in place by bands 14 associated with each spacer bar, each band being provided with fixing lugs 15 by which it is attached to the associated spacer bar, so that the pipe 13 is carried by the pipes 2 above the centre line between them.

Spaced at intervals along one side of the left-hand pipe 2 is a series of suction nozzles 12, each attached to a pipe 19 which passes through the sheath 9 and the buoyant material 7 and communicates with the interior of the tube 5. Projecting in a similar manner from the other side of the right-hand pipe 2 is a series of discharge nozzles 11, having openings 18, of similar form to the nozzles 12 and attached to pipes 19a which pass through the sheath 8 and the buoyant material 6 communicate with the interior of the pipe 4.

The pipe 13 has inside it a smaller pipe 16 which has openings 17 formed along its length and communicating with the interior of the pipe 13. By pumping water, for example, into and out of the pipe 13 by means of the pipe 16 the degree of buoyancy of the three-pipe assembly may be altered to ensure that the nozzle openings are just at, or slightly below, the surface of the sea.

The ship 3 carries suction and discharge pumps P, P' and a filtering apparatus F of any known type capable of separating immiscible liquids of different densities.

In operation the pipe line is laid on the surface of the sea so that it surrounds the patch of oil which is to be removed. The suction nozzles 12 dip into the surface layer and the oil, with a certain amount of sea water, is sucked into the pipe 5 and then carried into the ship, where it is forced through the filtering apparatus to separate the oil from the water. The oil is stored in tanks in the ship, so that it may subsequently be used for its original purpose, or for another useful purpose, while the water is returned by a pressure pump to the pipe 4 for discharging through the nozzles 11.

FIGURE 3 shows a somewhat different arrangement according to the invention in which a single pipe 20 is used. This comprises an inner pipe 21, a surrounding layer 22 of buoyant material and an outer sheath 23. Suction nozzles 24 are each attached to a pipe 28 which passes through the outer sheath 23 and the buoyant material 22 to communicate with the interior of the inner pipe 21. Attached to the opposite side of the pipe 20 is a series of struts 26 which support a vertical baffle 25 at a distance from the pipe 20. The baffle 25 may consist of a number of metal plates hooked or otherwise linked together, or it may consist of a continuous flexible band of reinforced fabric, plastic, rubber or the like. The baffle 25 is preferably arranged so that about two-thirds of its height is beneath the surface of the water while the remaining part is above the surface. It serves to break any waves or wash which may strike it so that the surface of the part enclosed by the pipe line is kept in a state of relative calmness.

It will be understood that the arrangement shown in FIGURE 2 may be used with only the two pipes 4 and 5, the pipe 13 being omitted. Where the pipe 13 is used the pipe 16, instead of being inside the pipe 13, may be secured outside and below this pipe. Furthermore, the pipe 13 may be divided longitudinally into a series of sections $S_1$, $S_2$, $S_3$ (FIG. 4), and instead of the single pipe 16, inside or outside the pipe 13, there may be a plurality of pipes $C_1$, $C_2$, $C_3$ each communicating with one of the sections, so that the buoyancy of the different sections of the pipe line may be varied individually to provide the best conditions for taking in the layer of surface oil.

It will be understood that the apparatus need not be arranged precisely as shown; for example, the pipes supporting the nozzles 11 and 12 need not project laterally but may be set at an upward or downward angle. The invention is accordingly to be limited only by the scope of the appended claims.

I claim:
1. Apparatus for removing a surface layer from a body of liquid comprising a flexible pipe surrounded by a layer of buoyant material and an outer sheath, whereby said flexible pipe floats on the surface of said body of liquid, a plurality of suction nozzles extending at spaced intervals along the length of said pipe, said nozzles projecting laterally outward from said pipe and in communication with the interior thereof, said nozzles being adapted to dip into said surface layer, suction means connected to said pipe to draw the liquid of said surface layer into said pipe through said nozzles, and filter means connected to said pipe and through which liquid is forced by said suction means thereby separating said surface layer liquid from the liquid of said body.

2. Apparatus as claimed in claim 1 in which said suction nozzles project from one side of said pipe, and a vertical baffle extending along the length of said pipe along the other side thereof, means connecting said baffle to said pipe, whereby said baffle will break waves and other disturbances in order to keep said surface layer in a calm state.

3. Apparatus for removing a surface layer of liquid of low density from a body of liquid of higher density comprising a pair of flexible pipes, means to hold said pipes in substantially parallel relationship, each pipe being surrounded by a layer of buoyant material and an outer sheath, whereby both of said pipes will float in said body of liquid, a plurality of suction nozzles extending at spaced intervals along the length of one of said pipes, said nozzles projecting laterally outward from said pipe and being in communication with the interior thereof, a plurality of discharge nozzles extending at spaced intervals along the length of the other pipe of said pair, said nozzles projecting laterally outward from said other pipe and being in communication with the interior thereof, suction means connected to the first of said pipes to draw liquid from said surface layer through said suction nozzles into said first pipe, means to separate the liquid of said surface layer from the liquid of said body of liquid, and means connected to said other pipe to discharge the liquid of said body of liquid into said other pipe.

4. Apparatus as claimed in claim 3 further comprising a third pipe supported above and between the pipes of said pair, and means to supply liquid to said third pipe in order to alter the buoyancy of the combination of three pipes.

5. Apparatus as claimed in claim 4 further comprising a fourth pipe inside said third pipe and having openings communicating with the interior of said third pipe, said liquid for altering said buoyancy being supplied through said fourth pipe.

6. Apparatus as claimed in claim 4 in which said third pipe is divided longitudinally into a number of sections, and further comprising an additional pipe for each section and communicating therewith, and means selectively to supply liquid to said sections through said additional pipes for selectively altering the buoyancy of said sections.

References Cited by the Examiner
UNITED STATES PATENTS

| | | | |
|---|---|---|---|
| 1,077,132 | 10/1913 | Erickson | 61—1 X |
| 1,397,891 | 11/1921 | Jones | 210—242 X |
| 1,397,892 | 11/1921 | Jones | 210—242 X |
| 1,450,545 | 4/1923 | Hans | 210—122 |
| 2,330,508 | 9/1943 | McColl | 210—242 |
| 2,682,151 | 6/1954 | Simpson et al. | 61—1 |
| 2,876,903 | 3/1959 | Lee | 210—242 |
| 2,891,672 | 6/1959 | In't Veld et al. | 210—242 |
| 2,908,393 | 10/1959 | Lanphier | 210—242 |

FOREIGN PATENTS

| | | |
|---|---|---|
| 1,255,045 | 1/1961 | France. |
| 829,756 | 3/1960 | Great Britain. |
| 843,131 | 8/1960 | Great Britain. |

ROBERT F. BURNETT, *Primary Examiner.*

REUBEN FRIEDMAN, *Examiner.*